United States Patent [19]
Hall

[11] Patent Number: 5,852,507
[45] Date of Patent: Dec. 22, 1998

[54] HIGH EFFICIENCY POLARIZATION DIVERSITY RECEIVER SYSTEM

[76] Inventor: David B. Hall, Litton Systems Inc., Guidance & Control Syst. Division, 5500 Canoga Ave., Woodland Hills, Calif. 91367

[21] Appl. No.: 644,881

[22] Filed: May 10, 1996

Related U.S. Application Data

[60] Provisional application No. 60/008,496 Dec. 11, 1995.
[51] Int. Cl.$^6$ .................................................. H04B 10/06
[52] U.S. Cl. ........................................... 359/192; 359/156
[58] Field of Search .................................... 359/192, 191, 359/190, 189, 156; 250/225

[56] References Cited

U.S. PATENT DOCUMENTS

| | | | |
|---|---|---|---|
| 5,008,958 | 4/1991 | Cimini, Jr. et al. ..................... | 359/156 |
| 5,023,946 | 6/1991 | Yamazaki et al. ....................... | 359/192 |
| 5,023,950 | 6/1991 | Tsushima et al. ....................... | 359/192 |
| 5,363,228 | 11/1994 | DeJule et al. ........................... | 359/117 |
| 5,448,058 | 9/1995 | Arab-Sadeghabadi et al. ......... | 250/225 |

*Primary Examiner*—Rafael Bacares
*Attorney, Agent, or Firm*—Klein & Szekeres, LLP

[57] ABSTRACT

A polarization diversity receiver system for yielding multiple heterodyne optical output signals from an incident optical beam having a p-polarized component and an s-polarized component comprises first and second sequentially-arrayed polarizing beamsplitters, and three photodetectors, each of which receives a heterodyne optical signal. The polarization diversity receiver system tracks the largest of these three signals, and uses only this largest one for subsequent signal processing. There is a minimum for this largest signal that is dependent on the input polarizations of the two optical fields whose beat note is the heterodyne signal. Thus, the object is to maximize the minimum of this largest of the three heterodyne signals. The first polarizing beamsplitter ideally splits the incident beam into a transmitted beam portion including approximately 100% of the p-polarized component and approximately 33% of the s-polarized component, and a reflected beam portion including approximately 0% of the p-polarized component and approximately 67% of the s-polarized component. The reflected beam portion exits from the first polarizing beamsplitter as a first heterodyne optical output signal, and impinges on a first photodetector. The transmitted beam portion exits from the first beamsplitter, and then undergoes an effective 45° rotation of its polarization eigenstates around its axis of propagation, either prior to or during its passage through the second polarizing beamsplitter. The second beamsplitter splits the rotated transmitted beam portion into second and third heterodyne optical output signals, which respectively impinge upon second and third photodetectors.

39 Claims, 2 Drawing Sheets

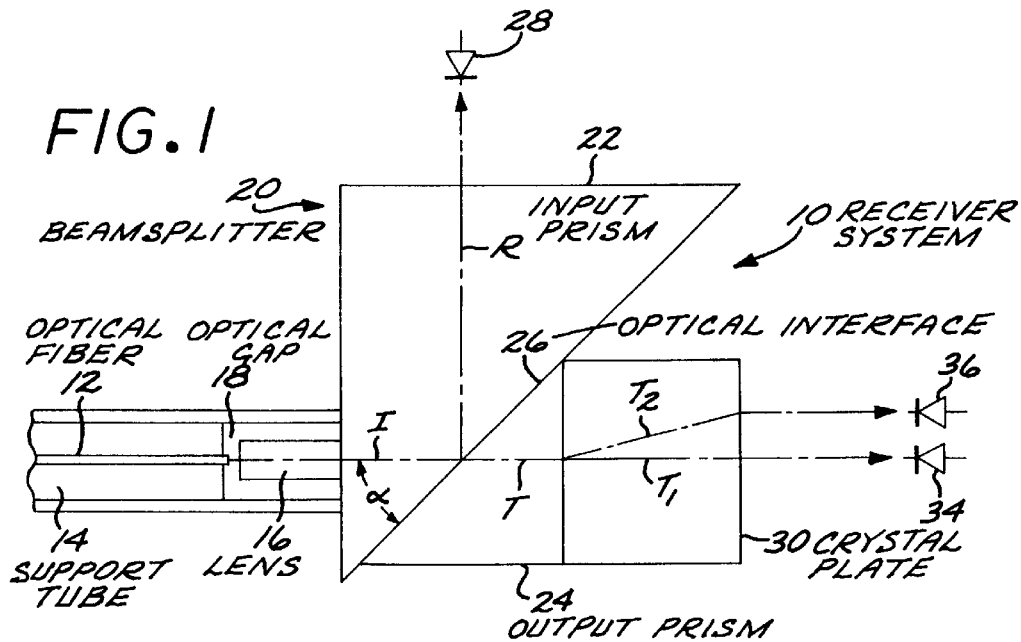
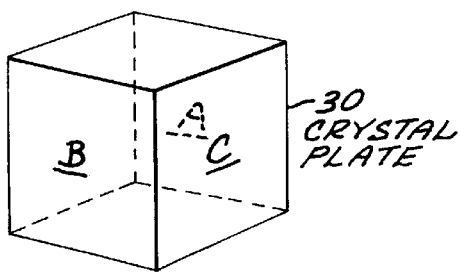
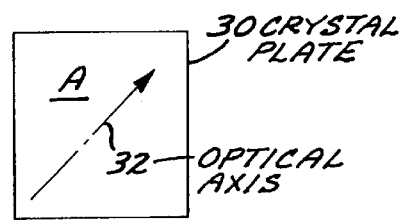
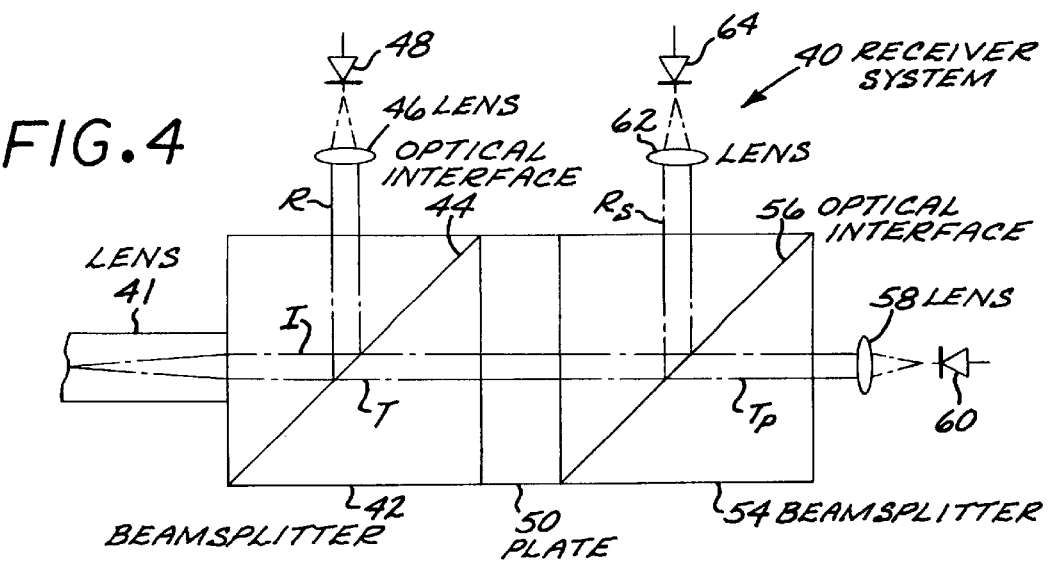

HIGH EFFICIENCY POLARIZATION DIVERSITY RECEIVER SYSTEM

CROSS-REFERENCE TO RELATED APPLICATION

This application claims the benefit, under 35 U.S.C. Section 119(e), of Provisional Application Serial No. 60/008,496; filed Dec. 11, 1995.

BACKGROUND OF THE INVENTION

The present invention relates generally to the field of optical signal receivers. More specifically, the present invention relates to an optical signal receiver that reduces or minimizes polarization signal fading in a fiber optic system.

A significant problem in systems that employ the reception of optical signals from an optical fiber is signal fading caused by changes in the polarization of the optical signals transmitted through the optical fiber. Specifically, phase information from two or more optical signals propagated through a fiber optic transmission line can be lost at the receiver if the polarizations of two signals of interest are crossed, resulting in no detector beat note. It is therefore necessary to provide some mechanism for treating the signal, before detection, that yields, in all cases of polarization wander, a suitably large detector beat note for signal processing.

One mechanism that addresses the above-described problem is described in U.S. Pat. No. 5,448,058, assigned to the assignee of the present invention. This patent discloses an apparatus comprising an array of photodetector elements preceded by a polarizer array, the latter including a plurality of polarizers having axes of polarization spaced apart by selected angles such that each optical signal incident on the polarizer array has a polarization component along at least one of the axes of polarization. The photodetector elements are arranged so that each receives light from a selected one of the polarizers. At least one photodetector element receives parallel polarization components from the optical signals to generate an electrical signal indicative of interference between the optical signals.

The above-described apparatus has a theoretical insertion loss of about 4.8 dB to about 9.0 dB. In practice, the need for spacers between adjacent photodetectors results in "dead space", yielding measured insertion losses of about 7 dB to about 10 dB. Furthermore, it requires a relatively precise alignment of the optic fiber, the polarizers, and the photodetectors. This characteristic makes the entire apparatus sensitive to vibrations and mechanical shock.

There has thus been a need for an optical signal detection apparatus that minimizes polarization signal fading with greatly reduced insertion losses, and with enhanced mechanical stability and resistance to misalignment due to vibrations and mechanical shock. It would be further desirable for such an apparatus to be capable of practical implementation with standardized optical components to the extent possible.

SUMMARY OF THE INVENTION

Broadly, the present invention is a high efficiency polarization diversity receiver system for yielding multiple heterodyne optical output signals from an incident optical beam having a p-polarized component and an s-polarized component. Each of the preferred embodiments of the present invention comprises first and second sequentially-arrayed polarizing beamsplitters, and three photodetectors, each of which receives a heterodyne optical signal. The polarization diversity receiver in accordance with the present invention tracks the largest of these three signals, and uses only this largest one for subsequent signal processing. There is a minimum for this largest signal that is dependent on the input polarizations of the two optical fields whose beat note is the heterodyne signal. Thus, the object is to maximize the minimum of this largest of the three heterodyne signals.

In the preferred embodiments of the present invention, the first polarizing beamsplitter ideally splits the incident beam into a transmitted beam portion including approximately 100% of the p-polarized component and approximately 33% of the s-polarized component, and a reflected beam portion including approximately 0% of the p-polarized component and approximately 67% of the s-polarized component. The reflected beam portion exits from the first polarizing beamsplitter as a first heterodyne optical output signal, and impinges on a first photodetector.

The transmitted beam portion exits from the first beamsplitter, and then undergoes an effective 45° rotation of its polarization eigenstates around its axis of propagation, either prior to or during its passage through the second polarizing beamsplitter. The second beamsplitter splits the rotated transmitted beam portion into second and third heterodyne optical output signals, which respectively impinge upon second and third photodetectors.

In a first preferred embodiment, the second polarizing beamsplitter comprises a uniaxial crystal plate that is optically coupled to the first beamsplitter so as to receive the transmitted beam portion therefrom. The crystal plate provides the effective 45° rotation of the polarization eigenstates of the transmitted beam portion, and splits the rotated transmitted beam portion into an ordinary ray transmitted through the plate with a first linear polarization, and an extraordinary ray transmitted through the plate with a second linear polarization that is orthogonal to the first linear polarization. The ordinary ray exits the plate as the second heterodyne optical output signal, and the extraordinary ray exits the plate as the third heterodyne optical output signal.

In a second preferred embodiment, the transmitted beam portion enters a half-wave retarder plate that is optically coupled to the first polarizing beamsplitter. The retarder plate provides the effective 45° rotation of the polarization eigenstates of the transmitted beam portion. The rotated transmitted beam portion then enters a second polarizing beamsplitter that is optically coupled to the retarder plate, and that splits the rotated transmitted beam portion into a second transmitted beam portion that is approximately 100% p-polarized, and a second reflected beam portion that is approximately 100% s-polarized. The second transmitted beam portion exits from the second beamsplitter as the second heterodyne optical signal, and the second reflected beam portion exits from the second beamsplitter as the third heterodyne optical output signal.

In a third preferred embodiment, the transmitted beam portion directly passes from the first polarizing beamsplitter into a second polarizing beamsplitter that is optically coupled directly to the first polarizing beamsplitter. The second beamsplitter is oriented with respect to the axis of propagation of the transmitted beam portion so as to provide an effective 45° rotation of the polarization eigenstates of the transmitted beam portion. The second polarizing beamsplitter splits the rotated transmitted beam portion into a second transmitted beam portion that is approximately 100% p-polarized, and a second reflected beam portion that is approximately 100% s-polarized. The second transmitted beam portion exits from the second beamsplitter as the second heterodyne optical signal, and the second reflected beam portion exits from the second beamsplitter as the third heterodyne optical output signal.

A polarization diversity receiver system constructed in accordance with the present invention is capable of functioning with insertion losses of less than 6 db, and even as low as 1 db or less. Furthermore, such a receiver is not dependent on precise alignment of its optical components, and it is therefore relatively insensitive to mechanical shock.

BRIEF DESCRIPTION OF THE DRAWINGS

FIG. 1 is a diagrammatic representation of a polarization diversity receiver system in accordance with a first preferred embodiment of the present invention;

FIG. 2 is a perspective view of a crystalline calcite block used as an optical beamsplitter in the embodiment of FIG. 1;

FIG. 3 is an elevational view of one face of the block of FIG. 2, showing the orientation of the optical axis with respect to that face;

FIG. 4 is a diagrammatic representation of a polarization diversity receiver system in accordance with a second preferred embodiment of the present invention;

DETAILED DESCRIPTION OF THE INVENTION

Figure 5:
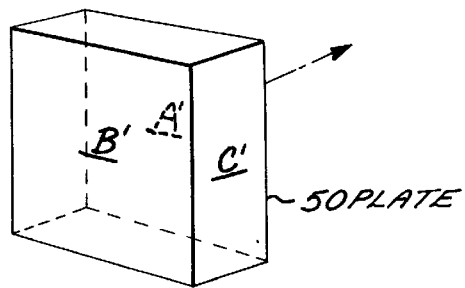
FIG. 5 is a perspective view of a crystalline quartz plate used as an optical half wave retarder plate in the embodiment of FIG. 4.

FIG. 1 represents a high efficiency polarization diversity receiver system 10, in accordance with a first preferred embodiment of the present invention. The receiver system 10 receives an optical signal from a single mode optical fiber 12 that transmits an optical signal (visible or infrared) from a suitable source (not shown), which may be a laser. The optical fiber 12 is rigidly supported within structural support tube or ferrule 14, in a manner well-known in the art. The optical signal emerges as a beam from the proximal end of the optical fiber 12 and enters a focusing lens 16 after traversing an optical gap 18. The lens 16 is preferably a graded index ("GRIN") lens, of the type that is commercially available from NSG America, Inc., Somerset, N.J., under the trademark "SELFOC", or the equivalent. The lens 16 focuses the optical beam in a manner to be described below. The gap 18 may be of any material, including air, that is transparent to the optical wavelength used. Preferably, the gap 18 is adjustable to assure that the optical beam enters the lens 16 with the proper amount of divergence to achieve the desired focal length for the lens.

The lens 16 is mechanically and optically coupled to a first polarizing beamsplitter 20. The first beamsplitter 20 comprises a first or input prism 22 (to which the lens 16 is coupled), and a second or output prism 24, coupled to the input prism 22 along a coated optical interface 26. The prisms 22, 24 are commercially available items of optical quality glass, preferably of the type marketed under the designation "BK7" by Schott Glasswerke, Mainz, Germany, or the equivalent.

The prisms 22, 24 are preferably right-angled prisms, and the optical interface 26 between them forms an angle $\alpha$ of 45° with respect to the incident optical beam I entering the first beamsplitter 20 from the lens 16. The interface 26 is optically coated to split the incident beam I into two beams, separated from each other by 90°, with different ratios of p-polarization and s-polarization of the optical signal. For this embodiment, the coating at the interface 26 is designed to achieve nearly an ideal 100% transmission of the p-polarized component of the signal, and thus nearly an ideal 0% reflection of the p-polarized component. For the s-polarized component, it is desired to achieve approximately an ideal transmission of 33%, and thus approximately an ideal reflection of 67%. Thus, the portion T of the optical signal transmitted through the interface 26 will include approximately 100% of its p-polarized component, and approximately 33% of its s-polarized component. The portion R of the optical signal reflected at the interface 26 will include almost none of its p-polarized component, and approximately 67% of its s-polarized component.

The specific coating needed to achieve the aforementioned polarization characteristics of the transmitted and reflected portions of the incident beam depends on the wavelength of the incident beam. If, for example, a nominal wavelength of 1320 nm is employed, the coating should be a so-called "quarter wave stack", comprising three layers of silicon nitride, each about 221 nm thick, alternated with two layers of silicon dioxide, each about 330 nm thick. These materials and dimensions will not achieve the ideal transmission and reflection ratios set forth above, but they will achieve sufficiently close approximations to yield useful results. It is considered to be well within the expertise of those of ordinary skill in the pertinent arts to provide specific coating compositions and thicknesses that are suitable for other wavelengths of potential interest.

The reflected portion R of the incident beam I is directed through the input prism 22, at a right angle to the transmitted portion, into a first photodetector 28. The transmitted portion T passes through the output prism 24 into a uniaxial calcite crystal plate 30 that is mechanically and optically coupled to the output prism 24 so as to receive the transmitted beam portion T therethrough. The calcite crystal plate 30 functions as a second polarizing beamsplitter, and, as shown in FIGS. 2 and 3, has an exit face A, an entry face B parallel to the exit face A, and a side face C. The calcite crystal plate 30 has an optical axis 32 that forms a 45° angle with the plane of the exit face A. As viewed from the exit face A, as shown in FIG. 3, the optical axis 32 extends as a diagonal across the exit face A at an angle of 45° to the side face C. This orientation of the optical axis 32 of the calcite crystal plate 30 provides an effective 45° rotation of the polarization eigenstates of the transmitted beam portion T around its axis of propagation between the two beamsplitters 20, 30.

The calcite crystal plate 30 propagates one linear polarization of the transmitted beam portion T as an ordinary ray, and the orthogonal polarization as an extraordinary ray at an angle of about 6° to the ordinary ray. The ordinary ray exits the calcite crystal plate 30 as a first transmitted beam portion $T_1$ which enters a second photodetector 34, while the extraordinary ray exits the calcite crystal plate 30 as a second transmitted beam portion $T_2$ which enters a third photodetector 36.

The optical dimensions of all optical components (i.e., the prisms 22, 24 and the calcite crystal plate 30) are selected to create an optical path length for the reflected beam portion R that is approximately equal to the optical path lengths for the transmitted beam portions $T_1$ and $T_2$. Proper selection of the GRIN lens 16 and the width of the optical gap 18 for the selected wavelength of the optical signal results in focused and magnified beam images impinging on each of the detectors 28, 34, 36. For example, for a nominal beam wavelength of 1320 nm, a quarter-pitch GRIN lens 16 of approximately 1.0 mm in diameter is separated from the end of the optical fiber 14 by a gap 18 of approximately 0.3 mm in width.

A high efficiency polarization diversity receiver system 40, in accordance with a second preferred embodiment of the invention, is illustrated in FIG. 4. In this embodiment, a collimating GRIN lens 41, receiving an optical signal from a single mode optical fiber (not shown) is optically and mechanically coupled to an input face of a first polarizing beamsplitter 42 into which it directs a collimated incident beam I. This first beamsplitter 42 includes a first optical interface 44 that is coated, as described above, to achieve nearly an ideal 100% transmission of the p-polarized component of the signal, and thus nearly an ideal 0% reflection of the p-polarized component. For the s-polarized component, it is desired to achieve approximately an ideal transmission of 33%, and thus approximately an ideal reflection of 67%. Thus, the portion T of the optical signal transmitted through the first interface 44 will include approximately 100% of its p-polarized component, and approximately 33% of its s-polarized component. The portion R of the optical signal reflected at the first interface 44 will include almost none of its p-polarized component, and approximately 67% of its s-polarized component.

The reflected portion R of the incident optical signal beam I is directed out of the first beamsplitter 42, at a right angle to the transmitted portion T of the beam, through a first focussing lens 46 into a first photodetector 48. The transmitted portion T of the incident optical signal beam I passes through the first beamsplitter 42 into a quartz half-wave retarder plate 50 that is mechanically and optically coupled to an output face of the first beamsplitter 42.

Figure 6:
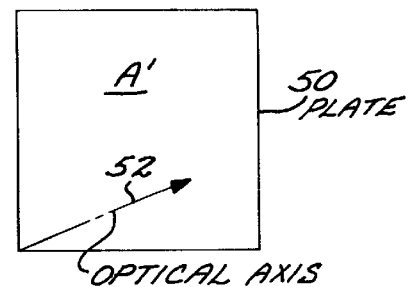
FIG. 6 is an elevational view of one face of the plate of FIG. 5, showing the orientation of the optical axis with respect to that face.

The retarder plate 50 rotates the polarization eigenstates of the transmitted beam portion T 45° around its axis of propagation. As illustrated in FIGS. 5 and 6, the retarder plate 50 has a polished exit face A', a polished entry face B' parallel to the exit face A', and a side face C'. To achieve the aforementioned 45° beam rotation, the retarder plate 50 has an optical axis 52 that is contained in a plane that forms an angle of 22°30' with respect to the side face C'. Furthermore, to achieve the required half-wave retardation, the orientation of the optical axis 52 with respect to the exit face A' and the thickness (measured in the direction of the axis of propagation) of the retarder plate 50 must be properly selected for the wavelength of the incident beam I. Thus, for example, where the incident beam I has a nominal wavelength of 1320 nm, the optical axis 52 is oriented at an angle of 13°4' with respect to the normal to the exit face A', and the thickness of the retarder plate 50 is approximately 1.5 mm.

Referring again to FIG. 4, upon exiting from the retarder plate 50, the transmitted beam portion T enters a second polarizing beamsplitter 54 that is optically and mechanically coupled to the exit face A' of the retarder plate 50. The second polarizing beamsplitter 54 is a commercially available item having a second optical interface 56 that is coated so as to transmit nearly 100% of the p-polarized component of the optical signal and nearly 0% of the s-polarized component, and to reflect nearly 100% of the s-polarized component and nearly 0% of the p-polarized component. The transmitted p-polarized component $T_p$ exits the second beamsplitter 54 along the original axis of propagation, and, after passing through a second focussing lens 58, impinges upon a second photodetector 60. The reflected s-polarized component $R_s$ exits the second beamsplitter 54 at a right angle to the original axis of propagation, and, after passing through a third focussing lens 62, impinges upon a third photodetector 64.

Figure 7:
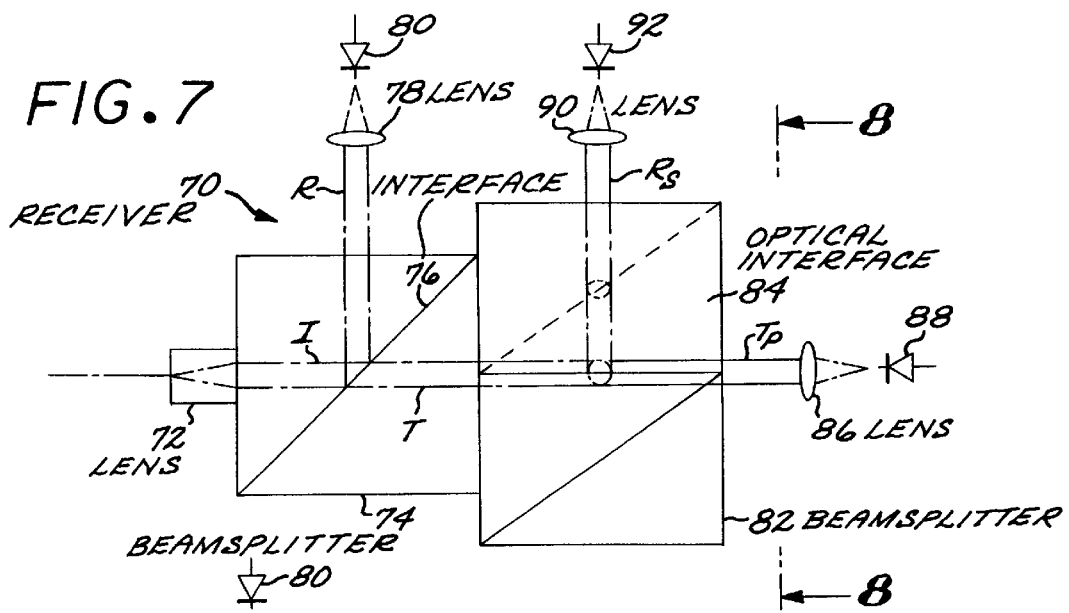
FIG. 7 is a diagrammatic representation of a polarization diversity receiver system in accordance with a third preferred embodiment of the present invention.
Figure 8:
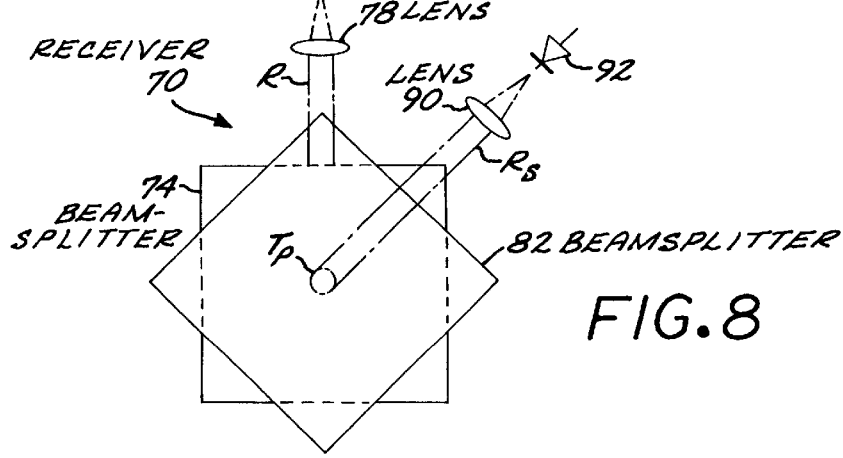
FIG. 8 is an elevational view taken along line 8—8 of FIG. 7.

A high efficiency polarization diversity receiver 70, in accordance with a third embodiment of the invention, is illustrated in FIGS. 7 and 8. In this embodiment, a collimating GRIN lens 72, receiving an optical signal from a single mode optical fiber (not shown) is optically and mechanically coupled to an input face of a first polarizing beamsplitter 74, into which it directs a collimated incident beam I. This first beamsplitter 74 is substantially identical in optical properties to the first beamsplitter 42 of the above-described second embodiment. Thus, the first beamsplitter 74 of the third embodiment includes a first optical interface 76 that is coated, as described above, to achieve nearly an ideal 100% transmission of the p-polarized component of the signal, and thus nearly an ideal 0% reflection of the p-polarized component. For the s-polarized component, it is desired to achieve approximately an ideal transmission of 33%, and thus approximately an ideal reflection of 67%. Thus, the portion T of the optical signal transmitted through the first interface 76 will include approximately 100% of its p-polarized component, and approximately 33% of its s-polarized component. The portion R of the optical signal reflected at the first interface 76 will include almost none of its p-polarized component, and approximately 67% of its s-polarized component.

The reflected portion R of the incident optical signal beam I is directed out of the first beamsplitter 74, at a right angle to the transmitted portion T of the beam, through a first focussing lens 78 into a first photodetector 80. The transmitted portion T of the incident optical signal beam I passes through the first beamsplitter 74 into a second polarizing beamsplitter 82, which is optically and mechanically coupled to an output face of the first beamsplitter 74. The second beamsplitter 82 of this third embodiment is substantially optically identical to the second beamsplitter 54 of the above-described second embodiment, except that in this third embodiment, it is physically rotated 45° around the axis of propagation of the transmitted portion T of the incident beam. Thus, the second beamsplitter 82 has a second optical interface 84 that is coated so as to transmit nearly 100% of the p-polarized component of the optical signal and nearly 0% of the s-polarized component, and to reflect nearly 100% of the s-polarized component and nearly 0% of the p-polarized component. The transmitted p-polarized component $T_p$ exits the second beamsplitter 82 along the original axis of propagation, and, after passing through a second focussing lens 86, impinges upon a second photodetector 88. The reflected s-polarized component $R_s$ exits the second beamsplitter 82 at a right angle to the original axis of propagation, and, after passing through a third focussing lens 90, impinges upon a third photodetector 92.

The polarization diversity receiver system 70 of the third embodiment differs from the system 40 of the second embodiment primarily in that the system 70 of the third embodiment requires no retarder plate 50 between the two beamsplitters 74, 82. On the other hand, it requires a physical rotation of the second beamsplitter 82 with respect to the first beamsplitter 54, so that the emerging reflected beam portions R and $R_s$ are not co-planar, as shown in FIG. 8. Accordingly, the first focussing lens 78 and the first photodetector 80 lie in a different plane from that in which the third focussing lens 90 and the third photodetector 92 lie. Therefore, while the system 40 of the second embodiment is somewhat more complex in terms of the number of components than is the system 70 of the third embodiment, it is amenable to more compact packaging, because its focussing lenses and photodetectors can all be made to lie in a single plane. This advantage is also achieved in the system 10 of the first embodiment.

It will be seen that all of the above-described embodiments can be implemented using mostly standardized optical components, except for the first beamsplitter, which requires a specialized coating, albeit a coating that is well within the skill of the ordinary practitioner in the relevant arts to select and to apply.

The operation of the invention is essentially the same for all embodiments. Nevertheless, the nomenclatures adopted above for the beam components in the second and third embodiments are identical, and, therefore, the operational description will be more readily generalized if it adopts the same nomenclature. Accordingly, for the purposes of the following operational description, it will be assumed that there are, functionally, first and second polarizing beamsplitters, the second of which rotates the polarization eigenstates of the transmitted beam portion 45° about the axis of propagation, and that the reflected and transmitted beam portions are properly focussed on their respective photodetectors after emerging from the beamsplitters.

Assume that the incident beam I includes optical fields A and B, each of which includes a p-polarized component and an s-polarized component. For each field, the first beamsplitter produces a first transmitted beam portion T that comprises approximately 100% of the p-polarized component and approximately 33% of the s-polarized component, and it produces a first reflected beam portion R that comprises approximately 67% of the s-polarized component. This first reflected beam portion R is detected by the first photodetector.

The second beamsplitter, with the above-described 45° polarization eigenstate rotation with respect to the first beamsplitter, produces an evenly-divided split of the p-polarized and s-polarized components received from the first beamsplitter. Thus, with nearly a 100% transmission of the p-polarized component and a nearly 100% reflection of the s-polarized component, as discussed above, the second photodetector receives a second transmitted beam portion $T_p$ that is nearly 100% p-polarized, while the third photodetector receives a second reflected beam portion $R_s$ that is nearly 100% s-polarized. The result of this arrangement of the two beamsplitters and their respective divisions of the incident beam on the basis of its polarization components is that the minimum possible amplitude of the largest of three photodetector signals is maximized. This signal is then tracked and used (to the exclusion of the others) for subsequent signal processing. Furthermore, as a consequence of the above-described arrangement of the beamsplitters and their polarization characteristics, there is a minimum, for each heterodyne signal, that is dependent on the input polarizations of the two fields A and B, whose beat note is that heterodyne signal, and, in the largest of the three heterodyne signals, this minimum will be maximized.

Moreover, the three photodetectors receive, in total, all of the optical signal in the incident beam I, in contrast to the apparatus described in the above-mentioned U.S. Pat. No. 5,448,058, in which a portion of the incident beam is absorbed by the polarizers, and another portion is incident on the inter-detector spacers.

Consequently, the above-described invention yields signal losses approximately 3 dB less than those experienced with the apparatus described in U.S. Pat. No. 5,448,058, and this improvement has been experimentally confirmed. Thus, insertion losses of 6 db or less are easily accomplished, with losses of 1 db or less being contemplated as achievable.

Furthermore, the provision for focussing the detected beam portions onto the respective photodetectors allows the use of smaller-area photodetectors than has previously been contemplated for similar applications. This smaller size yields a lower capacitance for the detectors, with resultant lower voltage noise, thereby yielding an improved signal-to-noise ratio in the detected signal, as compared with the prior art apparatus.

In addition, the present invention is not dependent on the precise alignment of its optical components, and is therefore relatively insensitive to mechanical shock and vibrations.

Although the invention has been described above in connection with an optical beam that is received from an optical fiber and then (in the second and third embodiments) collimated (e.g., by a GRIN lens), it will be readily understood that any of the embodiments may receive an optical signal from a laser beam without the need for an optical fiber, and that collimation of the beam (in the second and third embodiments) can be accomplished at any point, and by any suitable means, prior to the incident beam's entry into the first beamsplitter.

While several preferred embodiments of the present invention have been described hereinabove, it will be appreciated that a number of variations and modifications may suggest themselves to those skilled in the pertinent arts. Such variations and modifications should be considered within the spirit and scope of the present invention, as defined in the claims that follow.

What is claimed is:

1. A polarization diversity receiver system for yielding multiple heterodyne optical output signals from an incident optical beam having a p-polarized component and an s-polarized component, the system comprising:
   a first optical element, disposed so as to receive the incident beam, that splits the incident beam into a transmitted beam portion including approximately 100% of the p-polarized component and approximately 33% of the s-polarized component, and a reflected beam portion that exits the first optical element as a first heterodyne optical output signal including approximately 0% of the p-polarized component and approximately 67% of the s-polarized component;
   a first photodetector disposed so as to receive the first heterodyne optical output signal;
   a second optical element, disposed so as to receive the transmitted beam portion from the first optical element, that provides an effective 45° rotation of the polarization eigenstates of the transmitted beam portion, and that splits the transmitted beam portion into second and third heterodyne optical output signals;
   a second photodetector disposed to receive the second heterodyne optical output signal; and
   a third photodetector disposed to receive the third heterodyne optical output signal.

2. The polarization diversity receiver system of claim 1, wherein the first optical element includes a polarizing beamsplitter, and wherein the second optical element includes a uniaxial crystal plate that is optically coupled to the polarizing beamsplitter; wherein the second heterodyne optical output signal comprises an ordinary ray transmitted through the crystal plate with a first linear polarization; and wherein the third heterodyne optical output signal comprises an extraordinary ray transmitted through the crystal plate with a second linear polarization that is orthogonal to the first linear polarization.

3. The polarization diversity receiver system of claim 2, wherein the extraordinary ray forms an angle of approximately 6° with the ordinary ray.

4. The polarization diversity receiver system of claim 2, wherein the polarizing beamsplitter comprises first and second optical prisms mechanically and optically coupled to each other along an optical interface.

5. The polarization diversity receiver system of claim 4, wherein the optical interface forms an angle of approximately 45° with the incident beam and is coated with an optical coating comprising alternating layers of silicon nitride and silicon dioxide.

6. The polarization diversity receiver system of claim 5, wherein the optical coating comprises three layers of silicon nitride and two layers of silicon dioxide.

7. The polarization diversity receiver system of claim 1, wherein the first optical element comprises a first polarizing beamsplitter, and wherein the second optical element comprises:
  a second polarizing beamsplitter; and
  a half-wave retarder plate that is optically coupled between the first and second polarizing beamsplitters.

8. The polarization diversity receiver system of claim 7, wherein the transmitted beam portion is a first transmitted beam portion, wherein the reflected beam portion is a first reflected beam portion, and wherein the second polarizing beamsplitter splits the first transmitted beam portion into (a) a second transmitted beam portion that is approximately 100% p-polarized and that exits the second polarizing beamsplitter as the second heterodyne optical output signal, and (b) a second reflected beam portion that is approximately 100% s-polarized, and that exits the second polarizing beamsplitter as the third heterodyne optical output signal.

9. The polarization diversity receiver system of claim 7, wherein the first polarizing beamsplitter comprises first and second optical prisms mechanically and optically coupled to each other along an optical interface.

10. The polarization diversity receiver system of claim 9, wherein the optical interface forms an angle of approximately 45° with the incident beam and is coated with an optical coating comprising alternating layers of silicon nitride and silicon dioxide.

11. The polarization diversity receiver system of claim 10, wherein the optical coating comprises three layers of silicon nitride and two layers of silicon dioxide.

12. The polarization diversity receiver system of claim 1, wherein the first optical element comprises a first polarizing beamsplitter, and wherein the second optical element comprises a second polarizing beamsplitter rotated approximately 45° around the axis of propagation of the transmitted beam portion.

13. The polarization diversity receiver system of claim 12, wherein the first polarizing beamsplitter comprises first and second optical prisms mechanically and optically coupled to each other along an optical interface.

14. The polarization diversity receiver system of claim 13, wherein the optical interface forms an angle of approximately 45° with the incident beam and is coated with an optical coating comprising alternating layers of silicon nitride and silicon dioxide.

15. The polarization diversity receiver system of claim 14, wherein the optical coating comprises three layers of silicon nitride and two layers of silicon dioxide.

16. A polarization diversity receiver system for yielding multiple heterodyne optical output signals from an incident optical beam having a p-polarized component and an s-polarized component, the system comprising:
  a polarizing beamsplitter, disposed so as to receive the incident beam, that splits the incident beam into a transmitted beam portion including approximately 100% of the p-polarized component and approximately 33% of the s-polarized component, and a reflected beam portion that exits the first optical element as a first heterodyne optical output signal including approximately 0% of the p-polarized component and approximately 67% of the s-polarized component;
  a first photodetector disposed so as to receive the first heterodyne optical output signal;
  a uniaxial crystal plate, optically coupled to the beamsplitter so as to receive the transmitted beam portion therefrom, that provides an effective 45° rotation of the polarization eigenstates of the transmitted beam portion, and that splits the transmitted beam portion into second and third heterodyne optical output signals;
  wherein the second heterodyne optical output signal comprises an ordinary ray transmitted through the crystal plate with a first linear polarization; and wherein the third heterodyne optical output signal comprises an extraordinary ray transmitted through the crystal plate with a second linear polarization that is orthogonal to the first linear polarization;
  a second photodetector disposed to receive the second heterodyne optical output signal; and
  a third photodetector disposed to receive the third heterodyne optical output signal.

17. The polarization diversity receiver system of claim 16, wherein the extraordinary ray forms an angle of approximately 6° with the ordinary ray.

18. The polarization diversity receiver system of claim 16, wherein the polarizing beamsplitter comprises first and second optical prisms mechanically and optically coupled to each other along an optical interface.

19. The polarization diversity receiver system of claim 16, wherein the optical interface forms an angle of approximately 45° with the incident beam and is coated with an optical coating comprising alternating layers of silicon nitride and silicon dioxide.

20. The polarization diversity receiver system of claim 19, wherein the optical coating comprises three layers of silicon nitride and two layers of silicon dioxide.

21. The polarization diversity receiver system of claim 16, wherein the crystal plate has an exit face, an entry face parallel to the exit face, a side face, and an optical axis that forms an angle of approximately 45° with the plane of the exit face, wherein the optical axis, when viewed from the exit face, extends diagonally across the exit face at an angle of approximately 45° to the side face.

22. The polarization diversity receiver system of claim 16, wherein the optical dimensions of the beamsplitter and the crystal plate are selected so that the optical path length of the reflected beam portion is approximately equal to the optical path lengths of the transmitted beam portion.

23. The polarization diversity receiver system of claim 22, further comprising:
  a focusing lens, optically coupled to the polarizing beamsplitter so as to introduce the incident beam thereinto, and having a focal length selected so that each of the first, second, and third output signals is a magnified optical beam image focused so as to impinge on the first, second, and third photodetectors, respectively.

24. A polarization diversity receiver system for yielding multiple heterodyne optical output signals from an incident optical beam having a p-polarized component and an s-polarized component, the system comprising:

a first polarizing beamsplitter, disposed so as to receive the incident beam, that splits the incident beam into a first transmitted beam portion including approximately 100% of the p-polarized component and approximately 33% of the s-polarized component, and a first reflected beam portion that exits the first polarizing beamsplitter as a first heterodyne optical output signal including approximately 0% of the p-polarized component and approximately 67% of the s-polarized component;

a first photodetector disposed so as to receive the first heterodyne optical output signal;

a half-wave retarder plate optically coupled to the first polarizing beamsplitter so as to receive the first transmitted beam portion therefrom and so as to provide an effective 45° rotation of the polarization eigenstates of the transmitted beam portion;

a second polarizing beamsplitter optically coupled to the retarder plate so as to receive the rotated first transmitted beam portion therefrom and so as to split the rotated first transmitted beam portion into (a) a second transmitted beam portion that is approximately 100% p-polarized and that exits the second polarizing beamsplitter as a second heterodyne optical output signal, and (b) a second reflected beam portion that is approximately 100% s-polarized, and that exits the second polarizing beamsplitter as a third heterodyne optical output signal;

a second photodetector disposed to receive the second heterodyne optical output signal; and a third photodetector disposed to receive the third heterodyne optical output signal.

25. The polarization diversity receiver system of claim 24, wherein the first polarizing beamsplitter comprises first and second optical prisms mechanically and optically coupled to each other along an optical interface.

26. The polarization diversity receiver system of claim 25, wherein the optical interface forms an angle of approximately 45° with the incident beam and is coated with an optical coating comprising alternating layers of silicon nitride and silicon dioxide.

27. The polarization diversity receiver system of claim 26, wherein the optical coating comprises three layers of silicon nitride and two layers of silicon dioxide.

28. The polarization diversity receiver system of claim 24, wherein the retarder plate has an exit face, an entry face, a side face, and an optical axis that is contained in a plane that forms an angle of approximately 22°30' with respect to the side face.

29. The polarization diversity receiver system of claim 24, further comprising:

a collimating lens that is optically coupled to the first polarizing beamsplitter so as to introduce the incident beam thereinto as a substantially collimated optical beam; and first, second, and third focusing lenses that respectively focus the first, second, and third optical output signals so as to impinge, respectively, on the first, second, and third photodetectors.

30. A polarization diversity receiver system for yielding multiple heterodyne optical output signals from an incident optical beam having a p-polarized component and an s-polarized component, the system comprising:

a first polarizing beamsplitter, disposed so as to receive the incident beam, that splits the incident beam into a first transmitted beam portion including approximately 100% of the p-polarized component and approximately 33% of the s-polarized component, and a first reflected beam portion that exits the first polarizing beamsplitter as a first heterodyne optical output signal including approximately 0% of the p-polarized component and approximately 67% of the s-polarized component;

a first photodetector disposed so as to receive the first heterodyne optical output signal;

a second polarizing beamsplitter optically coupled to the first polarizing beamsplitter so as to (a) receive the first transmitted beam portion therefrom, (b) provide an effective 45° rotation of the polarization eigenstates of the transmitted beam portion, and (c) split the rotated first transmitted beam portion into (i) a second transmitted beam portion that is approximately 100% p-polarized and that exits the second polarizing beamsplitter as a second heterodyne optical output signal, and (ii) a second reflected beam portion that is approximately 100% s-polarized, and that exits the second polarizing beamsplitter as a third heterodyne optical output signal;

a second photodetector disposed to receive the second heterodyne optical output signal; and a third photodetector disposed to receive the third heterodyne optical output signal.

31. The polarization diversity receiver system of claim 30, wherein the second polarizing beamsplitter is rotated approximately 45° around the axis of propagation of the transmitted beam portion.

32. The polarization diversity receiver system of claim 30, wherein the first polarizing beamsplitter comprises first and second optical prisms mechanically and optically coupled to each other along an optical interface.

33. The polarization diversity receiver system of claim 32, wherein the optical interface forms an angle of approximately 45° with the incident beam and is coated with an optical coating comprising alternating layers of silicon nitride and silicon dioxide.

34. The polarization diversity receiver system of claim 33, wherein the optical coating comprises three layers of silicon nitride and two layers of silicon dioxide.

35. The polarization diversity receiver system of claim 30, further comprising:

a collimating lens that is optically coupled to the first polarizing beamsplitter so as to introduce the incident beam thereinto as a substantially collimated optical beam; and first, second, and third focusing lenses that respectively focus the first, second, and third optical output signals so as to impinge, respectively, on the first, second, and third photodetectors.

36. A method for generating multiple heterodyne optical output signals from an incident optical beam having a p-polarized component and an s-polarized component, the method comprising the steps of:

(a) splitting the incident beam into a transmitted beam portion including approximately 100% of the p-polarized component and approximately 33% of the s-polarized component, and a reflected beam portion that is propagated as a first heterodyne optical output signal including approximately 0% of the p-polarized component and approximately 67% of the s-polarized component;

(b) providing an effective 45° rotation of the polarization eigenstates of the transmitted beam portion; and (c) splitting the rotated transmitted beam portion into second and third heterodyne optical output signals.

37. The method of claim 36, wherein the step of splitting the rotated transmitted beam portion comprises the step of:

splitting the rotated transmitted beam portion into a second heterodyne optical output signal propagated as an ordinary ray having a first linear polarization, and a third heterodyne optical output signal propagated as an extraordinary ray having a second linear polarization that is orthogonal to the first linear polarization.

38. The method of claim 36, wherein the step of splitting the rotated transmitted beam portion comprises the step of:

splitting the rotated transmitted beam portion into (a) a second heterodyne optical output signal propagated as a second transmitted beam portion, and (b) a third heterodyne optical output signal propagated as a second reflected beam portion.

39. The method of claim 38, wherein the second transmitted beam portion is approximately 100% p-polarized, and wherein the second reflected beam portion is approximately 100% s-polarized.

* * * * *